Feb. 11, 1958     A. M. DE PASCALE     2,822,570
DEVICE FOR SHAPING FOOD PRODUCT
Filed Aug. 23, 1955
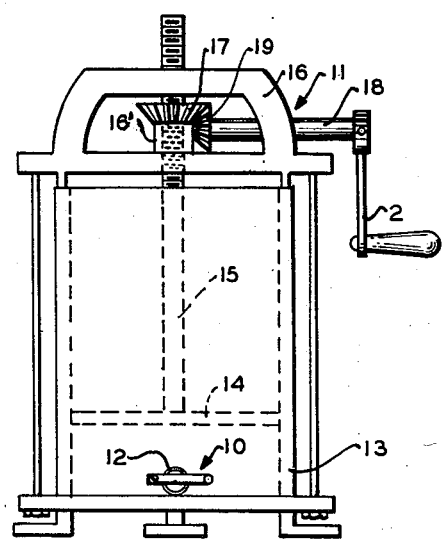
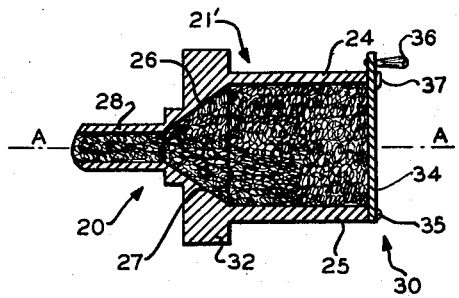
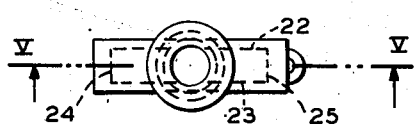
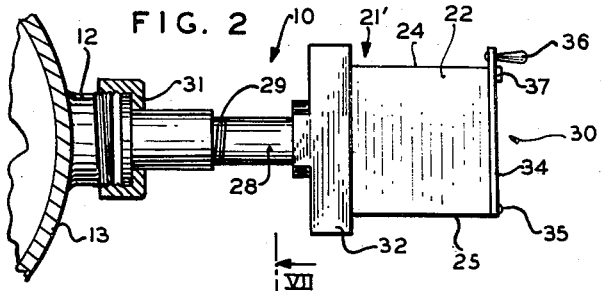
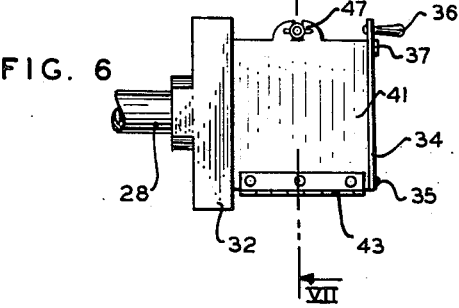
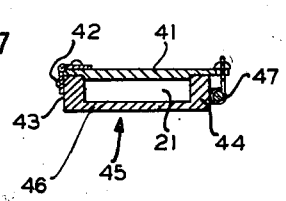
*INVENTOR.*
ANTHONY M. DE PASCALE
BY
ATTORNEY United States Patent Office

2,822,570
Patented Feb. 11, 1958

2,822,570

DEVICE FOR SHAPING FOOD PRODUCT

Anthony M. De Pascale, East Orange, N. J.

Application August 23, 1955, Serial No. 530,050

2 Claims. (Cl. 17—32)

The present invention relates to a device for producing meat products and relates more particularly to the formation of a strip or ribbon of compressed ground meat.

It is well known that various types of machines have been proposed and, in some cases, have been used for the formation of strips of ground or chopped meat to be cut into sections or cakes and stored in quantity for use in the subsequent making of sandwiches, commonly termed hamburgers. Machines for this purpose have been directed to meet a condition wherein the requirement has been to store a relatively large quantity of meat sections or cakes for future use or to be sold as such to numerous small restaurants to be placed in cold storage for use as needed.

It is well known that under present conditions in relatively small restaurants the practice in the preparation of hamburger cakes from ground meat is to mold by hand. Usually a rectangular mold comprising a bottom and side walls is employed. The ground meat is pressed into the mold by hand and removed in the form of a cake which, unless carefully formed, is of uneven thickness and often contains less meat than intended. Furthermore, this hand molded product lacks the desired uniform neat appearance so essential in an article of food. In addition to the above, the molding of such cakes is a time consuming and laborious operation.

The present invention is directed to the provision of a device that may be used in relatively small restaurants to enable the cook or attendant to quickly and conveniently apply the device to what is known as a sausage stuffer to mechanically turn out compressed sections of ground meat as needed and in amounts to meet current demands, or in limited amounts to be stored for daily use.

In the making of compressed meat sections of a selected form, usually rectangular, it is essential to be able to produce the sections of not only the desired density in each section produced, but to also maintain a uniform and smooth outer surface of each section, free from irregularities such as ragged edges which occur unless, as the sections are formed, means are provided for controlling the condition of the formed sections by correcting at will to produce the desired uniform surface of the compressed sections.

An object of the present invention is to provide an attachment for convenient application to an apparatus for extruding ground meat to form the extruded material into compressed sections of a selected configuration.

Another object of the invention is to provide a device for the formation of compressed meat sections of uniform density and outer surface.

Another object of the invention is to provide an attachment so arranged and constructed as to receive and compress ground material for the formation of a strip and for severing the strip into sections of selected size.

Another object of the invention is to provide an attachment for the formation of a strip of compressed ground meat in a forming passage provided with means whereby the condition of the material in the passage may be inspected for defects.

Another object of the invention is to provide a hamburger making attachment that may be readily cleaned after use.

Other objects and advantages of the invention will be more fully understood from the following description together with the accompanying drawing in which:

Fig. 1 is an elevational view of apparatus for the discharge of ground meat showing the present invention applied thereto;

Fig. 2 is a top view of an attachment in accordance with the present invention for the formation of cakes or strips of compressed meat, connected to a tank of ground meat;

Fig. 3 is an end view of the attachment shown in Fig. 2;

Fig. 4 is an end view of the attachment showing the coupling for connecting the cake former to a tank;

Fig. 5 is a view taken on line V—V in Fig. 4;

Fig. 6 is another view of the attachment as shown in Fig. 2, but provided with a cover for the cake forming passage;

Fig. 7 is a view taken on line VII—VII in Fig. 6 and;

Fig. 8 is a perspective fragmentary view of the present attachment and showing a strip or cake of formed meat being discharged therefrom.

The present attachment indicated as a whole by the reference character 10, may be applied to a device 11 of any suitable type for the discharge of ground material such as meat from a discharge outlet or spout 12 of tank 13. The device shown is one form of machine commonly employed for this purpose, and is known as a sausage stuffer.

As shown, within the tank 13 is a plunger or piston 14 having a threaded rod 15 disposed in threaded hub 16' mounted on a bracket 16 and provided with beveled gear 17. A shaft 18 rotatable in a bearing of bracket 16 is provided at one end with beveled gear 19 engaging beveled gear 17 and at the other end with a hand crank 2. Thus, when a quantity of ground meat or other material is deposited in the tank 13, a rotation of the shaft 18 will cause the piston to compress and force the ground material through spout 12.

It is to be understood that, although the device shown for the discharge of ground meat is hand operated, any suitable power driven mechanism may be employed.

The present device or attachment 10 consists of a cake forming or pressure compartment 21 which in the present practical embodiment of the invention is provided by a casing or container 21' to form what may be termed a rectangular passage defined by top wall 22, bottom wall 23, and side walls 24 and 25.

The top and bottom walls 22 and 23 of the casing are in relatively close relation to control the thickness of the strip to be formed and side walls 24 and 25 are spaced apart a relatively great distance to control the width of the strip to be formed. For example, that the cakes to be used may in some cases be about ⅜ of an inch in thickness and about 2¼ inches in width. The length of the cake as used may be about 5½". The dimensions or size of the cakes may vary in different localities.

At one end 20 of the container 21' which may be termed the inlet end, the inner surfaces of side walls 23 and 24 converge to provide surfaces 26 and 27 disposed in opposite angular relation to the axial line A—A of the attachment 10. The surfaces 26 and 27 intersect the inner surface of a conduit 28 of cylindrical form which is integral with container 21' and is threaded at 29 to connect with coupling 31 for attachment to spout 12 of tank 13. It has been found in practice that good results are obtained with the walls or surfaces 26 and 27 at an angle of about forty-five degrees to the axial line A—A. A flange or header 32 serves as an end wall for compartment 21 and gives rigidity to the device.

The opposite or outlet orifice end 30 of the chamber or passage 21 is provided with a stop member or door 34 hingedly connected at 35 to wall 25. The member 34 is provided with a hand piece 36 and when positioned to close the outlet end of compartment or passage 21 engages a latch 37. The stop member 34 is provided with a knife edge 38 for the purpose of severing the formed strip as will be hereinafter described.

When the present device is attached to the outlet spout 12 of a container 11, and stop member 34 is positioned to close the outlet end of chamber 21, an actuation of the piston 14 forces or extrudes the ground meat through conduit 28 into passage 21. The diverging walls 26 and 27 serve to facilitate the uniform distribution of the material into the forming chamber or passage 21, and as pressure is applied under the action of piston 14, the material is compressed into a compact mass filling the passage 21 and conditioned for discharge from the outlet end of the passage. The stop member is then moved out of the path of the compressed material which will issue in the form of a strip 39 as the piston 14 is moved to force material from the container 10. When a selected length of the strip or ribbon of compressed meat of rectangular form in transverse cross section has emerged, the knife edge of the stop member 34 may be actuated to sever the strip into sections or cakes of selected lengths.

It will be evident that the present attachment may be operated without the use of the stop member and the ground material may be forced from the tank through the compartment or passage 21 to form a strip to be severed by the knife edge 38. Cakes may thus be formed with satisfactory results. It has been found, however, that under such condition the strip does not have the desired compactness and, furthermore, the first portion of the strip to emerge is not sufficiently compressed to be of use and must be discarded or returned to the tank. This means either waste of material or undesirable handling with loss of time and labor.

When the compartment or passage 21 is packed by the closed door, the material is so tightly compressed that when it is permitted to discharge the frictional resistance with the walls of the passage causes the following material to be also highly compressed. Thus, a continuous strip of tightly packed material is obtained as it is forced from the tank into the passage 21 and out therefrom.

In the formation of a strip of compressed ground meat it is desirable to have all the sections or cakes of uniform appearance with smooth and uniform surfaces. In the formation of such strips or cakes when formed and compressed in the passage 21, it sometimes happens that the ground meat includes certain irregular portions, as pieces of gristle or the like, which contact the wall of the passage and resist movement with the main body of the material moving through the passage. When this occurs, the surface or surfaces of the issuing strip are marred by grooves or other irregularities.

In accordance with the present invention and as shown in Figs. 6 and 7, the compartment or passage 21 is provided with a removable cover plate 41 hinged at 42 to wall 43 and, when closed, seats in wall 44 of container 45, having bottom wall 46 to provide compartment 21 when the cover is closed. A latch 47 is provided to securely hold the cover plate 41 in place when the device is in operation to produce a strip of compressed ground material.

If, upon inspection of the strip as discharged, it is found that the surface of the strip is marred due to conditions as above pointed out, the operation may be stopped and the cover plate lifted to remove matter which causes the surface damage to the strip. Upon removal of the damaging matter the cover plate may be readily replaced and locked and the operation of the device continued to produce a strip with the desired smooth and uniform surface.

It is obvious that a device of the present character must be capable of being readily and conveniently cleaned. The cover plate 41, in addition to its function as above described, gives access to the interior of the passage for the removal of residual matter and thorough cleansing of the device after use which adds to the utility of the attachment in meeting sanitary requirements which are of primary importance in devices used in restaurants or by any purveyor of foods.

Although a preferred embodiment of the invention is shown and described herein, it is to be understood that modifications may be made therein without departing from the spirit and scope of the invention as set forth in the accompanying claims.

What is claimed is:

1. A device for the formation of a strip of ground compressed meat from ground meat discharged through the spout of a ground meat supply tank; said device comprising a casing providing an interior pressure compartment having a top wall, a bottom wall, side walls, and one end wall; said top, bottom and side walls all terminating in a common plane remotely opposite from said end wall and providing thereat an outlet orifice the full height and width of said compartment for the discharge of a strip of compressed meat; a meat-feeding conduit at the exterior of said end wall providing a passage of less cross-sectional area than, and leading into, said compartment through said end wall; a coupling for connecting said conduit to said spout for the passage of ground meat through said conduit into said compartment for expansion, reformation and compression therein and ultimate discharge from said orifice with a cross-sectional shape conforming to the shape of the orifice as defined by said top wall, side walls and bottom wall at said orifice, whereby the ground meat issues from said orifice compacted and in strip form; said top wall overlapping at its side edges both of the side walls of the compartment and having hinged connection to one said side wall and entirely removable from position overlying the compartment by swinging on said hinged connection and thereby affording full access to and permitting inspection of meat in said compartment with the casing remaining intact on said spout and continuing operative as soon as said top wall is closed; latch means at the opposite side wall from the hinging of said top wall for releasably retaining said top wall closed in tight engagement with the side walls where overlapping the same; and a member transverse to and pivoted at the end of one side wall next to said orifice, said member having a cutting edge at its bottom cooperating with the ends of said top, side and bottom walls for severing the strip at said orifice on said common plane of said ends, said member having an area larger than and completely closing said orifice on completion of severance of said strip.

2. A device in accordance with claim 1, wherein a means is provided on the end next to the orifice of the other side wall from the one to which said member is pivoted, for receiving said member and cooperating with the pivoting thereof to hold the member closely against the orifice-forming ends of said top, side and bottom walls for withstanding pressure of the ground meat in said compartment and maintaining a tight closure of said member for said orifice.

References Cited in the file of this patent

UNITED STATES PATENTS

| 768,127 | Jaques | Aug. 23, 1904 |
| 1,221,054 | Hyatt | Apr. 3, 1917 |
| 1,699,086 | Winkie | Jan. 15, 1929 |
| 2,085,108 | Louisot et al. | June 29, 1937 |
| 2,218,751 | Humphery | Oct. 22, 1940 |
| 2,481,690 | Schaub | Sept. 13, 1949 |
| 2,572,677 | Tench | Oct. 23, 1951 |

FOREIGN PATENTS

| 263,730 | Switzerland | Jan. 3, 1950 |